United States Patent Office 3,300,432
Patented Jan. 24, 1967

3,300,432
METHYLISOCYANATE POLYMER AND PROCESS THEREFOR
James A. Tarricone, Newark, Del., Clifton R. Neumoyer, Newport, Tenn., and William P. ter Horst, Rehoboth Beach, Del., assignors to Chemetron Corporation, Chicago, Ill., a corporation of Delaware
No Drawing. Filed Nov. 5, 1964, Ser. No. 409,292
9 Claims. (Cl. 260—29.6)

This invention relates to a novel isocyanate polymer and to a unique process for preparing such a polymer. More particularly, this invention relates to a methylisocyanate polymer and a novel method for catalyzing the methylisocyanate monomer.

Isocyanates have been utilized recently to produce homopolymers of organic isocyanates as described by Shashoua in U.S. 2,965,614. Various monovalent alkyl and aromatic substituted isocyanates are described in the subject patent as being polymerized with an alkyl metal anionic catalyst at a temperature which must be below —20° C. In addition to the low temperature restriction, special solvents must be employed if polymethylisocyanate is to form instead of cylic dimer and trimer compounds. Further, we have found that when methylisocyanate is treated with sodium cyanide at the described temperatures and conditions, no polymerized material is formed except the trimer. As pointed out in the Shashoua patent, the isocyanate dimers and trimers are of relatively low molecular weight and of little or no commercial value for the production of shaped articles.

It is therefore an object of this invention to provide a novel process for preparing polymethylisocyanate. It is a further object of the present invention to provide a process for preparing a polymer from methylisocyanate which can be carried out without the use and maintenance of low temperatures or solvents. It is another object of this invention to provide a novel polymethylisocyanate polymer. It is still another object of this invention to provide a polymethylisocyanate polymer which is transparent, has a high impact strength at low temperatures and is nonflammable. Other objects of the present invention will be apparent to one skilled in the art from the accompanying description and claims which follow.

It has been found that methylisocyanate can be polymerized to commercially useful products by treating the monomer with a catalytic amount of hexamethylenetetramine. This reaction and formation of polymethylisocyanate instead of dimer and trimer formation is highly unexpected because, as previously stated, this reaction does not occur with the catalyst of Shashoua nor would the following compounds cause the desired polymerization: Dabco, which is commonly called triethylene diamine, and is chemically 1,4-diazabicyclo (2,2,2) octane marketed by Houdry Process Corp., dimethyl formamide, tetramethylurea, trimethylamine, hexamethyl phosphorictriamide, 2-methylimidazole, hydrazodicarbonamide, glycol-uril, dimethylolurea, biuret, tris-1-aziridinylphosphineoxide, dimethylhydantoin, tri-allylamine, ethyleneurea, dicyandiamide, hexamethylenediamine-carbamate, pyridine, sodamide, azo-bis-isobutyronitrile, diethyl aminoethanol, ethylmorpholine, tetramethyl guanidine, hexamethyl-melamine, trimethyl nitrilopropionate. Further proof of the unexpected polymerization of methylisocyanate in the presence of hexamethylenetetramine is evidenced by the fact that whereas the methylisocyanate monomer will polymerize, ethylisocyanate, n-butylisocyanate, allyl-isocyanate or octadecylisocyanate will not polymerize with hexamethylenetetramine. Another aspect illustrating the unexpected catalysis is the insolubility of the hexamethylene tetramine in the methylisocyanate monomer.

The amount of the hexamethylenetetramine catalyst employed is not critical. Originally 5% by weight based on the methylisocyanate monomer was employed but the amount can be reduced to 0.6% without affecting polymerization. A temperature of about 40° C. is preferred during the polymerization but a temperature range from 10° C. to 80° C. is also operable; however, a range of 40° C. to 80° C. is preferred. No solvent is required during the catalysis of the methylisocyanate by the hexamethylenetetramine. However, the use of dioxane is preferred as a solvent for side reaction products as some minor amounts of dimer and trimer formed during the polymerization are soluble in the dioxane whereas the novel polymethylisocyanate polymer is not. Further with the use of the solvent the catalyzation can be controlled to a greater extent.

The presence of trace amounts of water does not affect polymerization in any way. While it is preferred to have a water-free system, polymerization takes place even when a 50% catalyst-water solution is employed. The polymerization can be carried out in the presence of air or nitrogen without any undesirable effect. However, iron does inhibit polymer formation. Therefore, glass, glass or resin lined, or stainless steel reactors should be employed.

The polymer of this invention is soluble in very few of the well recognized solvents for polymers. For example, the powerful solvents dimethylformamide, dimethyl sulfoxide and tetramethylurea do not dissolve it. The novel polymer is soluble in concentrated sulfuric acid, dichloracetic acid and trifluoracetic acid but it also degrades to an extent that an unsupported film cannot be cast from the solution. Likewise, the polymer is soluble in primary amines such as cyclohexylamine and piperidine but also degrades. Chloroform is the only solvent found thus far which acts as a true solvent. This is quite surprising because the novel polymer is insoluble in such close chemically related solvents as methylenechloride, carbontetrachloride, methylchloroform, bromoform, and trichlorosilane, to list only a few.

The chloroform solution of the methlisocyanate polymer is stable with no degradation on storage. From the chloroform solution films are cast which are strong and tough especially at low temperatures. Fibers can also be spun from the chloroform solution. A good method to produce filaments is to extrude a chloroform solution of the polymer into carbontetrachloride, methylethylketone or dioxane. The novel polymer will not burn, does not support combustion and is self extinguishing. It melts in the range of 220°–245° C. The novel polymer can be compression molded which is effected by applying 125 tons pressure for ten minutes at 250° F. which yields a slab of rigid molded plastic having a Shore-A hardness of 75.

An outstanding property of the polymer of this invention is its toughness at low temperatures. The material will not shatter when subjected to grinding in Dry Ice and its impact strength appears to double compared to its room temperature properties. The properties of the novel polymer when formed into a sheet or fiber make it useful as a substitute for known plastics when it is desired to use such plastics at low temperatures such as for protective coverings, piping or as a substitute for glass. The polymer of this invention in the form of films can also be employed in place of vinyl plastic without the use of a plasticizer. The flame resistance and its transparency make the polymer useful as a protective material when impregnated in materials such as cellulose, leather, textiles, paper and the like. Ultimately polymerization may be effected in situ on the previously described materials.

Infrared analysis of the polymer shows it to have the infrared spectrum shown in Table I.

TABLE I

| Vibrational mode: | Wave length in microns |
|---|---|
| Amide— | |
| C=O (stretch) | 5.90 |
| N—C=O (stretch) | 6.85 |
| —N—C—chain (stretch) | 8.40 |
| ring (bending) | Absent |
| N—CH$_3$ (stretch) | 10.65 |
| N—CH$_3$ (bending) | 13.20 |
| | 13.37 |
| Water— | |
| —OH (stretch) | 2.82 |
| End groups— | |
| —NH (stretch) | 2.98 |

Elemental analysis shows an empirical formula of $C_2OH_3N_{1\cdot1}$. The chain length of the novel polymer is controlled by employing chloroform in solution polymerization.

As will be seen in the examples to follow, the polymer of this invention can be plasticized, if desired, with dioctylphthalate or tris (dichloropropyl) phosphate. A chloroform solution of the novel polymer is also compatible with both polyvinyl chloride solutions and plastisols of polyvinyl chloride.

The following specific examples are intended for the purpose of illustrating the present invention. They should not be construed as limiting the invention to the precise reactants, ingredients or conditions specified.

Example I

To 200 grams of methylisocyanate, which is more than 99% pure, was added five grams of fine hexamethylenetetramine powder in a stoppered glass vessel. After an induction period of one-half to two hours, polymerization began as evidenced by a rise in temperature and rapidly increasing turbidity of the liquid. The temperature rose to about 60° C. and a pressure of about 30 pounds per square inch was autogenerated. Polymerization was complete in about 30 minutes and conversion of the methylisocyanate to a polymer was nearly quantitative. The polymer was obtained in a solid white mass. It had a very high molecular weight as evidenced by its solubility in chloroform wherein 5% polymethylisocyanate solution in chloroform is a gel and even an 0.8% solution in chloroform is highly viscous.

Example II

In this particular example polymerization was carried out in a glass reactor provided with a reflux condenser and was open to the atmosphere.

To 200 grams of pure methylisocyanate was added five grams of fine hexamethylenetetramine powder and heat was applied. The boiling point of methylisocyanate is about 41° C., and at this temperature polymerization took place very rapidly. The polymer was obtained as a white mass at the bottom of the flask and as a transparent or translucent film on the wall of the flask and of the reflux condenser. The polymer was identical to the polymer obtained in Example I.

Example III

This example illustrates the use of dioxane as a solvent in the polymerization of methylisocyanate.

To a resin flask provided with a stirrer and a reflux condenser were charged 400 grams of pure, freshly distilled methylisocyanate at 20° C., 400 grams of dioxane also at 20° C., and 8 grams of finely powdered hexamethylenetetramine. The admixture was made while stirring, and heat was cautiously applied while, at the same time, the upper half of the flask was cooled externally by packing in Dry Ice. At about 28° C. a polymer began to form and heating was discontinued. The temperature of the reaction medium rose to 45° C. and was held at 45–48° C. for 3½ hours. The resulting mass was cooled to room temperature and filtered. The residual polymer which was a fine powder, weighed 262 grams and had a melting point of 221° C. From the filtrate was recovered 73 grams of the trimer, trimethylisocyanurate. The desired polymer was then dissolved in chloroform to yield a clear film.

Examples IV, V and VI illustrate the plasticizing of the polymethylisocyanate polymer with dioctylphthalate and tris (dichloropropyl) phosphate.

Example IV

A mixture of five grams of polymethylisocyanate and five grams of dioctylphthalate was dissolved in 45 grams of chloroform. A small amount of insoluble material was filtered off through glass wool and the filtrate was evaporated, yielding a flexible and translucent sheet or film.

Example V

Methylisocyanate was polymerized in the presence of 30% dioctylphthalate and 1% hexamethylenetetramine by heating at 30° C. a mixture of 480 grams of methylisocyanate, 100 grams of dioctylphthalate and 10 grams of hexamethylenetetramine. There was obtained 343 grams of polymer from which a highly flexible film could be cast. The polymer formed was dissolved in chloroform, filtered, and the filtrate was evaporated, yielding a flexible opaque film.

Example VI

To 100 grams of a 2% solution of polymethylisocyanate in chloroform was added two grams of tris (dichloropropyl) phosphate. To this solution was added an equal volume of methylethylketone. The plasticizer, as well as the polymer, was insoluble in this mixed solvent and separate together as a gel. Upon evaporation of residual solvent there remained a flexible film which was much more flexible and transparent than unplasticized polymethylisocyanate.

The remaining examples illustrate the compatibility of polymethylisocyanate with polyvinylchloride and plastisols thereof.

Example VII

A 2% solution of polymethylisocyanate in chloroform was mixed with varying amounts of a 10% solution of polyvinylchloride in tetrahydrofuran. The particular polyvinylchloride resin was Bakelite Resin VAGH. Upon evaporation of the solvent a clear film resulted with varying degrees of stiffness depending on the amount of polyvinylchloride solution employed.

Example VIII

The same procedure is followed as outlined in Example VII except methylethylketone is substituted for tetrahydrofuran. The same clear film results as indicated in the preceding example.

Example IX

A low gel temperature plastisol was made from 100 parts of Geon–121, which is polyvinylchloride supplied by B. F. Goodrich Company, 90 parts of butoxyphthalate, and three parts of a cadmium-barium soap, which is a stabilizer for polyvinylchloride, sold under the name of Ferro–1720 by Ferro Chemical Corporation. Two grams of this previously described 52% plastisol were added to 25 grams of a 2% solution of polymethylisocyanate in chloroform. Even without the application of heat to fuse the material, a film formed, and after one hour of heating at 65–75° C. an excellent, flexible film was obtained.

Example X

The same results were obtained as in Example IX following the same procedures as outlined therein when a high gel temperature polyvinylchloride-plastisol was employed. The high gel temperature plastisol was prepared from 100 parts of Geon–121, 50 parts of butoxyphathalate, 50 parts of Flexol EPO, which is an epoxidized soy bean oil made by Union Carbide Co., and three parts of Ferro-1720.

In addition to the particular resins indicated in the foregoing examples with which the novel polymethylisocyanate is compatible it has also been found that polymethylisocyanate can be combined with a copolymer of vinylchloride and vinylether sold under the name of Vinoflex by Badische Anilin- und Soda-Fabrik. The novel polymer is also compatible with new low temperature plasticizers such as dibutyl-sebacate and Paraplex which is primarily a high or intermediate molecular weight polyester plasticizer sold by Rohm & Haas Co.

From the foregoing description it will now be seen that there is provided a novel polymethylisocyanate polymer which, because of its transparency, nonflammability and ability to withstand impact and flexing at low temperature is adaptable to use where previously, polymers could not be employed. The novel polymer can be plasticized easily with well-known plasticizers and plastisols to enhance its basic properties. The process by which the methylisocyanate monomer is polymerized is carried out easily, without the need for low temperatures, solvents and consequent special equipment and excessive handling. No special precautions need be taken to provide an anhydrous reaction condition. The novel process results in yields which are nearly quantitative without formation of excessive amounts of the dimer and trimer.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

We claim:
1. A process for catalytically polymerizing methylisocyanate comprising treating methylisocyanate monomer with a catalytic amount of hexamethylenetetramine.
2. The process as defined in claim 1 wherein the amount of said hexamethylenetetramine is in the range of about 0.6% to 5.0% by weight based on the methylisocyanate.
3. The process as defined in claim 1 wherein the amount of hexamethylenetetramine is about 1% by weight based on the methylisocyanate.
4. The process as defined in claim 1 wherein the temperature during catalysis is in the range of about 50° C. to about 80° C.
5. The process as defined in claim 1 wherein a minor amount of water is present during catalysis.
6. A polymerized methylisocyanate when produced according to the process of claim 1.
7. A polymerized methylisocyanate when produced according to the process of claim 2.
8. A polymerized methylisocyanate when produced according to the process of claim 3.
9. A polymerized methylisocyanate when produced according to the process of claim 4.

References Cited by the Examiner
UNITED STATES PATENTS

| | | | |
|---|---|---|---|
| 2,965,614 | 12/1960 | Shashoua | 260—77.5 |
| 3,200,155 | 8/1965 | Kirkpatrick et al. | 260—75 |

FOREIGN PATENTS 684,678　7/1949　Great Britain.

MURRAY TILLMAN, *Primary Examiner.*
J. L. WHITE, *Assistant Examiner.*